> United States Patent Office 3,575,888
Patented Apr. 20, 1971

3,575,888
SILVER CATALYST
John C. Long, Houston, Tex., assignor to Shell Oil
Company, New York, N.Y.
No Drawing. Filed Apr. 28, 1969, Ser. No. 819,961
Int. Cl. B01j 11/20
U.S. Cl. 252—476
7 Claims

ABSTRACT OF THE DISCLOSURE

A supported silver catalyst, useful in the preparation of ethylene oxide, is produced by reducing a dried, supported, reducible silver compound, in the absence of any substantial amount of water, with a solution of a reducing agent in a suitable solvent in which the silver compound is at most only slightly soluble.

BACKGROUND OF THE INVENTION

This invention relates to an improved, supported silver catalyst useful in the oxidation of olefins to olefin oxides, and to the method of its production.

Catalysts consisting essentially of silver, in the form of the metal or an oxide, upon a suitable support are known to be useful in catalyzing certain chemical oxidation reactions. They find application in the production of ethylene oxide by the controlled incomplete oxidation of ethylene. The importance of its role in such processes has led to intensive search for silver catalysts enabling their use with improved efficiency. This has resulted in inventive contributions based upon methods of manufacture as well as the incorporation of agents intended to modify their characteristics.

In ethylene oxide production, ethylene oxide will generally constitute but a relatively small part of the total effluent stream leaving the oxidation reaction zone. This is generally due to the fact that substantial amounts of inert diluent materials unavoidably and/or willfully enter the reaction zone together with reactants. Under these conditions, operation of the process within the realm of practicability will often depend upon the ability to increase, even if only by a few yield points, the ethylene oxide yield.

A known method of preparing silver catalysts comprises the consecutive steps of precipitating silver as oxide or hydroxide by adding caustic soda or caustic potash to a solution of silver salt, filtering, washing and slurrying the oxide or hydroxide and depositing it on the support, drying and subsequently reducing with hydrogen to metallic silver.

Another method of preparation is to saturate a support with a solution of a silver salt followed by drying and reduction of the deposited silver at elevated temperatures with hydrogen.

In still another method supports are impregnated with aqueous silver nitrate and then treated with an aqueous reducing agent.

Catalysts prepared by these methods often prove to be unsatisfactory. The metallic silver generally is deposited nonuniformly upon the support. As a result, heat transfer within the catalyst support is relatively poor, the catalyst tends to exhibit hot spots, and ethylene oxide yield obtained therewith is often relatively low.

STATEMENT OF THE INVENTION

In accordance with the present invention an improved silver catalyst, particularly suitable for use in the incomplete oxidation, in vapor phase, of olefins to olefin oxides, is obtained by impregnating a catalyst support with a solution of a reducible silver salt, removing the solvent, and thereafter treating the impregnated support in the absence of any substantial amount of water, with a solution of a reducing agent, in a suitable solvent in which the silver salt is substantially insoluble. Catalysts prepared in accordance with the invention have a uniform silver deposit upon the interior as well as the exterior surfaces of the porous structure of the catalyst particles, exhibit substantially improved thermal conductivity, and when used as catalyst in ethylene oxide production by the controlled incomplete oxidation of ethylene enable the attainment of substantially increased yields.

DESCRIPTION OF THE PREFERRED EMBODIMENTS

In a preferred embodiment of the invention, an improved supported silver catalyst is prepared by the consecutive steps of impregnating a suitable porous catalyst support with a solution of a reducible silver compound, subjecting the resulting impregnated support to drying under relatively mild temperature conditions to effect the removal therefrom of at least about 80% by weight of absorbed solvent, and then treating the dried impregnated support, under substantially anhydrous conditions, at a temperature of from about $-10°$ C. to about $+55°$ C. with a reducing agent, in the presence of a suitable solvent for the reducing agent. Suitable solvents for the reducing agent comprise those having no substantial solubility for the silver compound and which do not undergo substantial reaction with the reducing agent under the conditions employed.

By the term "reducible silver compounds" as used in the present specification and attached claims, is meant those compounds from which metallic silver is obtained by chemical reduction or by combined thermal decomposition and chemical reduction. Such compounds include, for example, silver salts of mineral acids such as silver nitrate, silver carbonate, silver complexes including ammoniacal silver complexes, silver salts of carboxylic acids such as formic, acetic, propionic, pivalic, malic, lactic, tartaric, salicylic and maleic acid, etc. Preferred of these compounds are those which are readily soluble, for example, in concentrations of at least 10 grams per liter, preferably at least 50 grams per liter, in the specific liquid media used as solvents in the support impregnating steps of the catalyst preparation. Particularly preferred is silver nitrate. The concentrations of the silver compounds in the impregnating solutions should in general be adjusted to provide a silver content in the final catalysts of between about 3 and about 25% wt., preferably between about 5 and about 15% wt., calculated as weight of silver metal on the weight of the support. Multiple impregnations may be used to achieve desired silver content.

Suitable solvent components of the impregnating solution comprise broadly any solvent in which the silver compound to be deposited possesses appreciable solubility and which is substantially inert. Water is a suitable inert solvent for the water-soluble silver salts, such as silver nitrate, and aqueous impregnating solutions are preferably employed.

Solvent removal after the impregnation comprises such steps as decantation, drying and the like. In the drying step, conditions are controlled to effect the removal by evaporation of at least about 80% by volume of absorbed liquid from the impregnated support. Preferably at least about 90% volume of absorbed liquid is removed. Removal of at least about 95% volume is especially preferred. Drying of the impregnated support is generally carried out under relatively mild conditions, for example such that temperature of the impregnated support during drying is maintained between about 70° C. and about 200° C.

Subsequent to the drying step the dried impregnated support is contacted with a solution of a reducing agent in a solvent under conditions effecting the conversion of the silver salt to silver in the metallic and/or oxide form, in the absence of any substantial amount of water. Conditions assuming the reduction of the silver compound under substantially anhydrous conditions are preferred.

Suitable reducing agents comprise, for example, hydrazine, hydroxyl amine, formaldehyde, acetaldehyde, and the like. Hydrazine is particularly preferred.

Essential to the invention is the use of the reducing agent in the presence of a suitable solvent enabling the formation of the reduced silver to proceed even within the pore structure, under substantially anhydrous conditions. Suitable solvents for the reducing agent comprise broadly those in which the silver compound present has no appreciable solubility, which is miscible with the reducing agent and which does not enter into any substantial reaction with the reducing agent under the conditions employed. Examples of such suitable solvents are: the monohydric and polyhydric alcohols, such as ethanol, isopropanol, butanol, ethylene glycol, propylene glycol, etc. Of these the alkanols, particularly the lower alkanols, are preferred. These are preferably employed in the anhydrous form. A particularly preferred reducing solution comprises anhydrous hydrazine in absolute ethanol.

The concentration of the reducing agent in the substantially anhydrous solvent may vary widely within the scope of the invention. The specific concentrations of solutions preferably employed will be governed to some extent by the specific solvent and reducing agent used. It is, however, preferred to employ reducing solutions containing the solvent in substantial excess. Thus, reducing solutions containing from about 1% v. to about 20% v. of the reducing agent are satisfactory. Preferred are dilute solutions containing about 2% to about 10% v., and still more preferably from about 4% to about 6% v. of the reducing agent.

Execution of the reduction of the supported silver compound is carried out at temperatures which may vary widely within the scope of the invention. The specific temperature preferably employed will vary to some extent in accordance with the specific reducing solution and silver compound employed. Temperatures in the range of from about −10° C. to about 55° C. are suitable; a temperature in the range of from about −5° C. to about 25° C. is generally preferred.

After the reduction step excess liquid may be removed by conventional means comprising one or more such steps as decantation, drying and the like.

Without intent to limit the scope of the invention by theory advanced herein to set forth more fully the nature of the invention, it is believed that the continuous and uniform coating upon the support including its internal porous structure, characteristic of the catalysts prepared in accordance with the invention, is attributable at least in part to the execution of the reduction in the presence of the reducing solution in the substantial absence of water. In the former methods employed the silver was generally reduced in molecular form whereas in the method of the invention the reduction comprises reduction of ionic form at the location of deposition. In the prior methods of silver deposition using aqueous solutions lack of uniformity of the resulting silver deposit is directly attributable to pore blockage by silver metal formation occurring upon the exterior surface of the support. Under the conditions prevailing in the method of the invention and the substantially anhydrous reducing solution, for example, anhydrous hydrazine in absolute ethanol, diffusion of the solution into the pore structure is able to take place with reduction of silver in ionic form to silver metal at its location of deposition even relatively deep within the pore support structure. For the foregoing reason the use of reducing agents which release water during reduction of the silver compound, such as, for example, hydrazine hydrate, are generally unsuitable. Supports for catalysts in accordance with this invention can be selected at will from the large number of conventional catalyst carriers or support materials. Such conventional support materials may be of natural or synthetic origin and of microporous and/or macroporous structure. They may have the shape of fine particles, chunks, pieces, pellets, rings, spheres and the like. The suitable supports comprise those of siliceous and/or aluminous compositions. Specific examples of suitable supports are the aluminum oxides, including the material sold under the trade name "Alundum," charcoal, pumice, magnesia, kieselguhr, fuller's earth, silicon carbide, porous aggregates comprising silicon and/or silicon carbide, fused alumina, selected clays, artificial and natural zeolites, metal oxide gel-type materials comprising oxides of heavy metals such as chromium, molybdenum, tungsten and the like, ceramics, etc. Supports particularly useful in the preparation of catalysts in accordance with this invention comprise the aluminous materials, in particular alpha-alumina. In the case of aluminum oxide supports, preference is given to those having a pore volume between about 0.15 and about 0.30 ml./g. and surface area below about 10 m.$^2$/g., more preferably less than about 1 m.$^2$/g. The carriers may be in the form of a powder having, for example, particle sizes and size distributions which are conventional for fluid-bed application, and also in the form of other small particles, such as pellets, rings or spheres having diameters above about 0.8 mm.

The present novel silver catalysts have been shown to be particularly useful catalysts for the direct oxidation of olefins with molecular oxygen to olefin oxides, more in particular for the oxidation of ethylene to ethylene oxide. The conditions for carrying out such oxidation reactions in the presence of the silver catalysts of the present invention comprise broadly those described in the prior art. This applies, for example, to suitable temperatures, pressures, residence times, diluent materials, such as nitrogen, carbon dioxide, steam, argon, methane or other saturated hydrocarbons, presence or absence of moderating agents to control the catalytic action, for example, 1,2-dichloroethane or chlorinated polyphenyl compounds, the desirability to employ recycle operations or to apply successive conversions in different reactors to increase the yields of the products envisages, and any other special conditions which may be selected in the processes for preparing ethylene oxide, propylene oxide or other olefin oxides from the corresponding olefinic hydrocarbons. For example, the controlled oxidation with an oxygen-containing gas of monoolefinic hydrocarbons such as ethylene and propylene, to the corresponding oxides with the aid of the novel silver catalysts of the invention may be carried out at temperatures in the range of, for example, from about 150 to about 450° C., and preferably in the range of from about 200 to about 300° C. Pressures in the range of from about atmospheric to about 500 p.s.i. are generally employed. Higher pressures may, however, be employed within the scope of the invention. Molecular oxygen employed as reactant is obtained from any suitable source. The suitable oxygen charge may consist essentially of relatively pure oxygen, a concentrated oxygen stream comprising oxygen in major amount with lesser amounts of one or more diluents such as nitrogen, argon, etc. The use of more oxygen streams, including air, as the oxygen reactant source is comprised within the scope of the invention.

It will therefore be clear that the use of the present novel silver catalysts in olefin oxidation reactions is in no way limited to the use of any specific conditions among those which are effective. In the said oxidation reactions the catalysts of this invention are preferably used in fixed beds although the application of fluidized catalyst beds is not excluded.

Preparation of silver catalysts in accordance with the invention and their use in the preparation of ethylene oxide will be further exemplified by the following examples:

Example I

A silver catalyst, catalyst A, was prepared by the process in accordance with this invention. As catalyst support was used 3/16" diameter spheres of Alundum with a surface area of less than 1 m.$^2$/g., and pore volume of 0.20 ml./g.

This support was impregnated with a 56% wt. aqueous solution of silver nitrate, vacuum being applied to insure complete impregnation. Excess liquid was drained off and the impregnated support was dried in air at about 90° C. until weighing indicated no further water weight loss. This material was then reduced at about 0° C. with a 3% v. solution of anhydrous hydrazine in absolute ethanol. After one hour, an additional 3% v. of hydrazine based on the volume of reducing solution was added to the reducing solution and the reduction was completed in another hour. Approximately 10 g. of reducing solution was used for each gram of impregnated support.

Following reduction the catalyst was drained, rinsed with water and dried. The silver content of the finished catalyst was 10.2% wt. Microscopic examination showed continuous uniform coating of silver over the interior and exterior surfaces.

Example II

In two separate comparative operations ethylene was produced by the silver catalyzed controlled oxidation, with molecular oxygen (air), of ethylene. The two operations were carried out under substantially identical conditions but with the exception that the catalyst A of Example I was employed in one of the operations and a commercially available catalyst, catalyst B, was empolyed in the second.

The catalyst B consisted of 10% wt. silver on 3/16" diameter spheres of Alundum with a surface area of less than 1 m.$^2$/g. and a pore volume of about 0.20 ml./g.

Conditions employed and results obtained in each of the comparative operations are shown in the following table:

TABLE I

|  | Run 1 | Run 2 |
|---|---|---|
| Catalyst | A | B |
| Temperature, ° C | 251 | 250 |
| Pressure, p.s.i.g | 200 | 200 |
| Space velocity, hr.$^{-1}$ | 2,360 | 2,360 |
| Percent ethylene in charge | 28.00 | 30.00 |
| Ethylene/O$_2$ ratio | 3.5 | 4.0 |
| Ethylene conversion, percent | 9.4 | 7.0 |
| Selectivity to ethylene oxide | 69.8 | 68.5 |
| Moderator concentration, p.p.m. equivalent Cl$_2$ | 3.5 | 3.5 |

I claim as my invention:

1. The process for the production of an improved supported silver catalyst particularly suitable for use in the oxidation of olefinic hydrocarbons which consists essentially of impregnating a catalyst support with a solution of a reducible silver salt, removing at least 80% of the absorbed liquid from said impregnated support, and thereafter treating under substantially anhydrous conditions said impregnated support with a solution of a reducing agent in a solvent which is miscible with said reducing agent and in which said silver salt has no appreciable solubility.

2. The process in accordance with claim 1 wherein said silver salt is silver nitrate.

3. The process in accordance with claim 2 wherein said reducing agent is anhydrous hydrazine.

4. The process in accordance with claim 3 wherein said solvent for said reducing agent is an anhydrous lower alkanol.

5. The process in accordance with claim 4 wherein said lower alkanol is absolute ethanol.

6. The process in accordance with claim 5 wherein said treatment of said impregnated support with said solution of said reducing agent is carried out at a temperature in the range of from about −10° C. to about 55° C.

7. The process in accordance with claim 6 wherein at least about 90% of the absorbed liquid is removed from said impregnated support before treating said impregnated support with said solution of said reducing agent.

References Cited

UNITED STATES PATENTS

| 2,245,183 | 6/1941 | Christ | 260—348 |
| 2,992,238 | 7/1961 | Zimmerman | 260—348.5 |
| 2,920,052 | 1/1960 | Martin | 252—463 |
| 2,847,475 | 8/1958 | Voge | 260—604 |
| 3,162,682 | 12/1964 | Shotts | 260—523 |
| 2,578,841 | 12/1951 | Robertson | 260—683.5 |
| 2,773,844 | 12/1956 | Carlson | 252—463 |

DANIEL E. WYMAN, Primary Examiner

P. M. FRENCH, Assistant Examiner

U.S. Cl. X.R.

252—443, 447, 454, 463